(12) United States Patent
Maruyama et al.

(10) Patent No.: US 12,147,595 B2
(45) Date of Patent: Nov. 19, 2024

(54) INFORMATION PROCESSING SYSTEM

(71) Applicant: HONDA MOTOR CO., LTD., Tokyo (JP)

(72) Inventors: Kenta Maruyama, Tokyo (JP); Junichiro Onaka, Tokyo (JP); Junya Obara, Tokyo (JP); Yusuke Ishida, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/244,382

(22) Filed: Sep. 11, 2023

(65) Prior Publication Data

US 2024/0085976 A1    Mar. 14, 2024

(30) Foreign Application Priority Data

Sep. 12, 2022    (JP) .................. 2022-144359

(51) Int. Cl.
*G06F 3/01*    (2006.01)
*G06T 3/40*    (2024.01)
(Continued)

(52) U.S. Cl.
CPC .............. *G06F 3/012* (2013.01); *G06F 3/017* (2013.01); *G06T 3/40* (2013.01); *G06V 20/59* (2022.01); *G06V 40/28* (2022.01)

(58) Field of Classification Search
CPC ........... G06F 3/012; G06F 3/017; G06T 3/40; G06V 20/59; G06V 40/28
See application file for complete search history.

(56) References Cited

U.S. PATENT DOCUMENTS

2015/0042799 A1    2/2015    Zhang et al.
2019/0143211 A1    5/2019    Tada et al.
(Continued)

FOREIGN PATENT DOCUMENTS

JP    2009-038428    2/2009
JP    2009-252105    10/2009
(Continued)

OTHER PUBLICATIONS

Japanese Office Action for Japanese Patent Application No. 2022-144359 mailed May 21, 2024.
(Continued)

*Primary Examiner* — Bryan Earles
(74) *Attorney, Agent, or Firm* — Amin, Turocy & Watson, LLP

(57) ABSTRACT

An information processing system includes a first device that is mounted in a mobile object which an occupant boards and a second device that is used by a user at a place different from the mobile object. The first device includes a first communication device configured to communicate with a second communication device of the second device and a camera unit. The second device includes the second communication device configured to communicate with the first communication device, a detection device configured to detect an orientation direction and a gesture of the user, and a display device configured to display an image corresponding to the orientation direction when seen from the predetermined seat out of images captured by the camera unit. The second device determines an operation unit of the mobile object oriented by the user and operation details on the operation unit from the image on the basis of the detected orientation direction and the detected gesture.

10 Claims, 12 Drawing Sheets

(51) Int. Cl.
  *G06V 20/59*  (2022.01)
  *G06V 40/20*  (2022.01)

(56) References Cited

U.S. PATENT DOCUMENTS

| | | |
|---|---|---|
| 2020/0159014 A1 | 5/2020 | Yasui et al. |
| 2020/0258306 A1* | 8/2020 | Forutanpour ............. G06T 9/00 |
| 2023/0069742 A1* | 3/2023 | Rafferty ................. B60R 11/04 |
| 2023/0314156 A1* | 10/2023 | Yahata ............... G01C 21/3638 |
| | | 701/436 |
| 2024/0085976 A1 | 3/2024 | Maruyama et al. |

FOREIGN PATENT DOCUMENTS

| | | |
|---|---|---|
| JP | 2012-096687 | 5/2012 |
| JP | 2017-056860 | 3/2017 |
| JP | 6557810 | 8/2019 |
| JP | 2020-094958 | 6/2020 |
| JP | 2020-142657 | 9/2020 |
| JP | 2020-145612 | 9/2020 |
| JP | 2020-155936 | 9/2020 |
| JP | 2020-177347 | 10/2020 |
| JP | 2022-040819 | 3/2022 |
| JP | 2024-039760 | 3/2024 |
| WO | 2018/012628 | 1/2018 |
| WO | 2018/230563 | 12/2018 |

OTHER PUBLICATIONS

Japanese Office Action for Japanese Patent Application No. 2024-152505 mailed Sep. 24, 2024.

* cited by examiner

| | OCCUPANT ID | COMMUNICATION IDENTIFICATION INFORMATION | USER ID OF TARGET USER |
|---|---|---|---|
| 360A | 001 | ... | AAA, DDD, ... |
| | 002 | ... | NO LIMIT |
| | ... | ... | ... |

| | USER ID | COMMUNICATION IDENTIFICATION INFORMATION | OCCUPANT ID OF TARGET OCCUPANT |
|---|---|---|---|
| 360B | AAA | ... | 001, 005, ... |
| | BBB | ... | 006, 007, ... |
| | ... | ... | ... |

| OCCUPANT ID | USER ID | OPERATION AUTHORITY OF USER |
|---|---|---|
| 001 | AAA | AUDIO |
| 002 | ALL | AUDIO |
| 002 | AAA | AUDIO, NAVIGATION, AIR-CONDITIONING SETTING |
| ... | ... | ... |

INFORMATION PROCESSING SYSTEM

CROSS-REFERENCE TO RELATED APPLICATION

Priority is claimed on Japanese Patent Application No. 2022-144359, filed Sep. 12, 2022, the content of which is incorporated herein by reference.

BACKGROUND

Field of the Invention

The present invention relates to an information processing system.

Description of Related Art

In the related art, study about sharing an image of an outside view or the like through communication between a device mounted in a mobile object such as a vehicle and a device used at a place different from the mobile object has been carried out (Japanese Unexamined Patent Application, First Publication No. 2020-94958).

In the related art, both an occupant in a mobile object and a user located in a place different from the mobile object may not satisfactorily feel a sense of realism.

SUMMARY

The present invention was made in consideration of the aforementioned circumstances and an objective thereof is to provide an information processing system that can enhance a sense of realism which is given to both an occupant in a mobile object and a user located at a place different from the mobile object.

An information processing system according to the present invention employs the following configurations.

(1) According to an aspect of the present invention, there is provided an information processing system including a first device that is mounted in a mobile object which an occupant boards and a second device that is used by a user at a place different from the mobile object, wherein the first device includes: a first communication device configured to communicate with a second communication device of the second device; and a camera unit including one or more cameras including at least an inside camera that is provided on a predetermined seat of the mobile object and images the inside of the mobile object when seen from the predetermined seat, the second device includes: the second communication device configured to communicate with the first communication device; a detection device configured to detect an orientation direction and a gesture of the user; and a display device configured to display an image corresponding to the orientation direction when seen from the predetermined seat out of images captured by the camera unit, the second device determines an operation unit of the mobile object oriented by the user and operation details on the operation unit from the image on the basis of the detected orientation direction and the detected gesture, and the second communication device transmits the determined operation details on the operation unit to the first communication device.

(2) In the aspect of (1), the display device may change and display a position of the operation unit according to the gesture.

(3) In the aspect of (1), the display device may change and display a size of the operation unit according to the gesture.

(4) In the aspect of (1), the display device may highlight operation units that are able to be operated by the user out of a plurality of the operation units.

(5) In the aspect of (1), the second device may determine an operation unit of the mobile object of which operation is permitted to the user from the image on the basis of an operation authority to the operation unit of the mobile object set for the user.

(6) In the aspect of (1), the first device may further include a display configured to display an image indicating the operation unit which is oriented by the user.

(7) In the aspect of (1), the second communication device may transmit information of the orientation direction to the first communication device, the first device may further include a first control device configured to control the first communication device such that an image corresponding to the orientation direction acquired via the first communication device out of images captured by the camera unit is selectively transmitted to the second communication device, and the display device of the second device may display an image corresponding to the orientation direction when seen from the predetermined seat and acquired via the second communication device.

(8) In the aspect of (1), the first communication device may transmit images captured by the camera unit to the second communication device, and the second device may further include a second control device configured to selectively display an image corresponding to the orientation direction out of the images captured by the camera unit on the display device.

(9) In the aspect of (1), the display device may be a display device of a virtual reality (VR) goggle, and the detection device may include a physical sensor attached to the VR goggle.

(10) In the aspect of (1), the mobile object may be a vehicle, and the predetermined seat may be a passenger's seat.

According to the aspects of (1) to (10), it is possible to enhance a sense of realism which is given to both an occupant in a mobile object and a user located at a place different from the mobile object.

BRIEF DESCRIPTION OF THE DRAWINGS

FIG. 10 is a diagram illustrating an example of details of user data for defining an operation authority to a mobile object.

DESCRIPTION OF EMBODIMENTS

Hereinafter, an information processing system according to an embodiment of the present invention will be described with reference to the accompanying drawings. The information processing system includes a first device that is mounted in a mobile object which an occupant boards and a second device that is used by a user at a place different from the mobile object. The mobile object is, for example, a vehicle but may be any mobile object as long as an occupant can board it. The occupant is mainly a driver of the mobile object, but may be an occupant other than the driver.

Voice collected by microphones is transmitted between the first device and the second device and is reproduced by speakers, which is a state as if a telephone call is carried out. A part of an image captured by a camera unit of the first device is displayed by the second device, whereby mixed reality (MR) is provided to the second device. The first device and the second device do not have to be in a one-to-one relationship, and one of a plurality of first devices and a plurality of second devices may be matched in a one-to-multiple relationship and operate as an information processing system. In the latter, for example, one occupant can be made to communicate simultaneously or sequentially with a plurality of users.

Basic Configuration

Figures 1, 2:
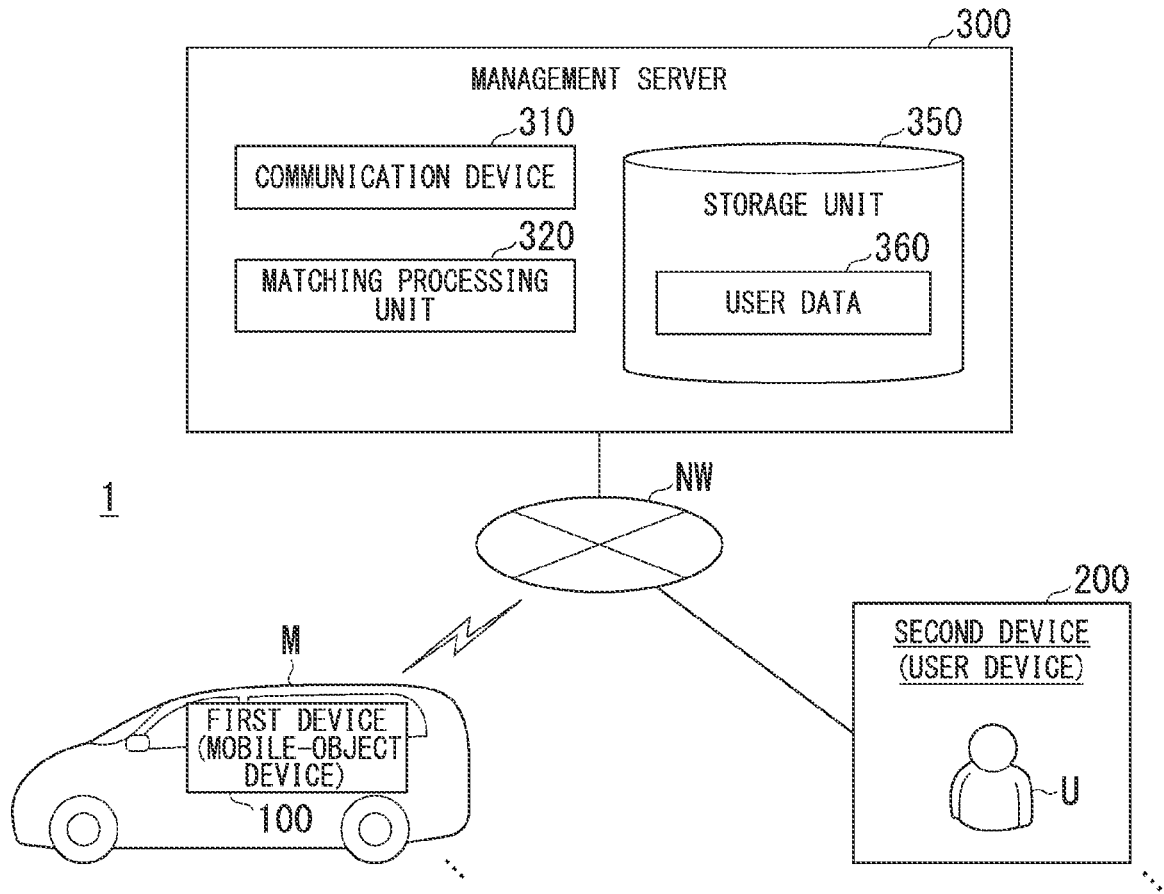
FIG. 1 is a diagram illustrating a usage environment or the like of an information processing system and a management server.
FIG. 2 is a diagram illustrating an example of details of user data.

FIG. 1 is a diagram illustrating a usage environment or the like of an information processing system 1 and a management server 300. The information processing system 1 includes a first device (a mobile-object device) 100 that is mounted in a mobile object M and a second device (a user device) 200 that is used by a user U at a place different from the mobile object M (a place accidentally close thereto is not excluded). The first device 100, the second device 200, and the management server 300 communicate with each other via a network NW. The information processing system 1 may include the management server 300 or may not include the management server 300.

The management server 300 includes, for example, a communication device 310, a matching processing unit 320, and a storage unit 350. User data 360 is stored in the storage unit 350.

The communication device 310 is a communication interface for connection to the network NW. Communication between the communication device 310 and the first device 100 and communication between the communication device 310 and the second device 200 are performed, for example, on the basis of the Transmission Control Protocol/Internet Protocol (TCP/IP).

The matching processing unit 320 is realized, for example, by causing a processor such as a central processing unit (CPU) to execute a program (an instruction group) stored in a storage medium. The storage unit 350 includes a random access memory (RAM), a hard disk drive (HDD), and a flash memory.

FIG. 2 is a diagram illustrating an example of details of the user data 360. The user data 360 includes, for example, an occupant list 360A in which an occupant ID which is identification information of an occupant P, communication identification information (such as an IP address) thereof, and a user ID which is identification information of a user U as a matching target are correlated and a user list 360B in which the user ID, communication identification information (such as an IP address) thereof, and an occupant P as a matching target are correlated. The user data 360 is not limited to the mode illustrated in FIG. 2 and may be generated in any mode as long as it includes such information.

When a matching request from a user U via the second device 200 or a matching request from an occupant P via the first device 100 is received by the communication device 310, the matching processing unit 320 performs matching of the user U and the occupant P with reference to the user data 360, transmits the communication identification information of the first device 100 of the occupant P to the second device 200 of the matched user U via the communication device 310, and transmits the communication identification information of the second device 200 of the user U to the first device 100 of the matched occupant P via the communication device 310. The first device 100 and the second device 200 having received the communication identification information performs communication in higher real time, for example, based on a user datagram protocol (UDP).

Figure 3:
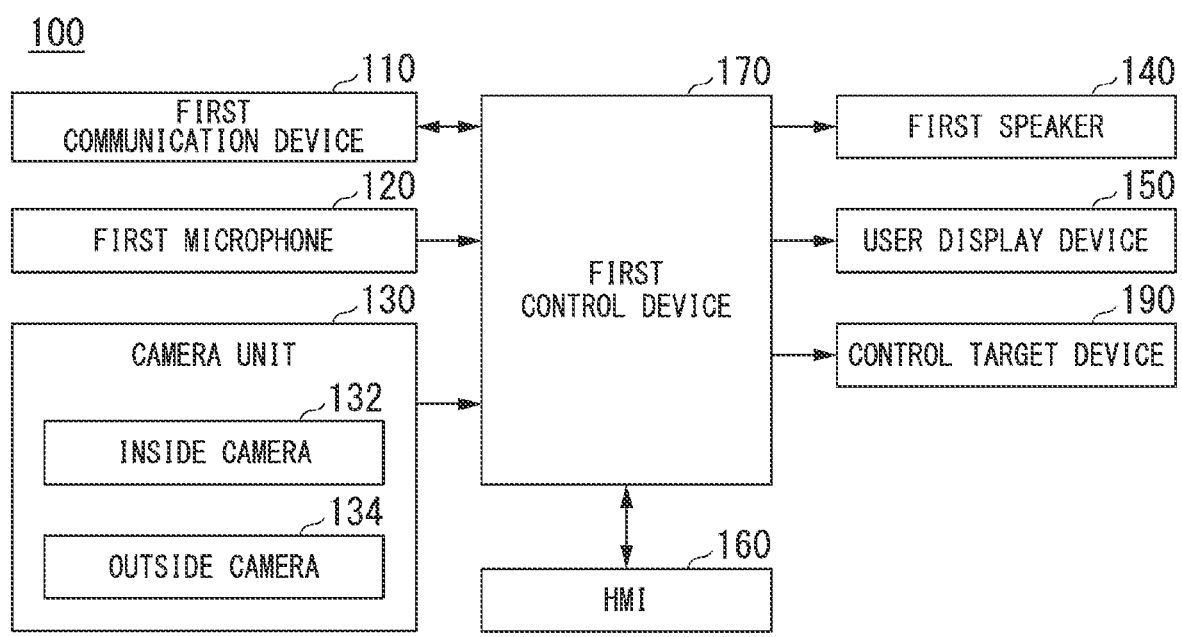
FIG. 3 is a diagram illustrating a configuration of a first device.

FIG. 3 is a diagram illustrating a configuration of the first device 100. The first device 100 includes, for example, a first communication device 110, a first microphone 120, a camera unit 130, a first speaker 140, a user display device 150, a human-machine interface (HMI) 160, and a first control device 170. The first control device 170 is connected to a control target device 190 mounted in the mobile object M.

The first communication device 110 is a communication interface that communicates with the communication device 310 of the management server 300 and a second communication device 210 of the second device 200 via the network NW.

The first microphone 120 collects at least voice uttered by the occupant P. The first microphone 120 is provided inside of the mobile object M and may have sensitivity with which voice outside of the mobile object M can also be collected, or may include a microphone provided inside of the mobile object M and a microphone provided outside of the mobile object M. For example, the voice collected by the first microphone 120 is transmitted from the first communication device 110 to the second communication device 210 via the first control device 170.

The camera unit 130 includes at least an inside camera 132 and may include an outside camera 134. The first speaker 140 outputs voice uttered by the user U and acquired via the first communication device 110. Details of arrangement or the like of the camera unit 130 and the first speaker 140 will be described later with reference to FIG. 4.

The user display device 150 virtually displays the user U as if the user U were present inside of the mobile object M. For example, the user display device 150 displays a hologram or displays the user U on a part corresponding to a mirror or a windshield of the mobile object M.

The HMI 160 is a touch panel or an audio response device (an agent device). The HMI 160 receives various instructions for the first device 100 from the occupant P.

The first control device 170 includes, for example, a processor such as a CPU and a storage medium connected to the processor and storing a program (an instruction group) and controls the constituent units of the first device 100 by causing the processor to execute the instruction group.

The control target device 190 includes, for example, a navigation device and a driving support device mounted in the mobile object M.

Figure 4:
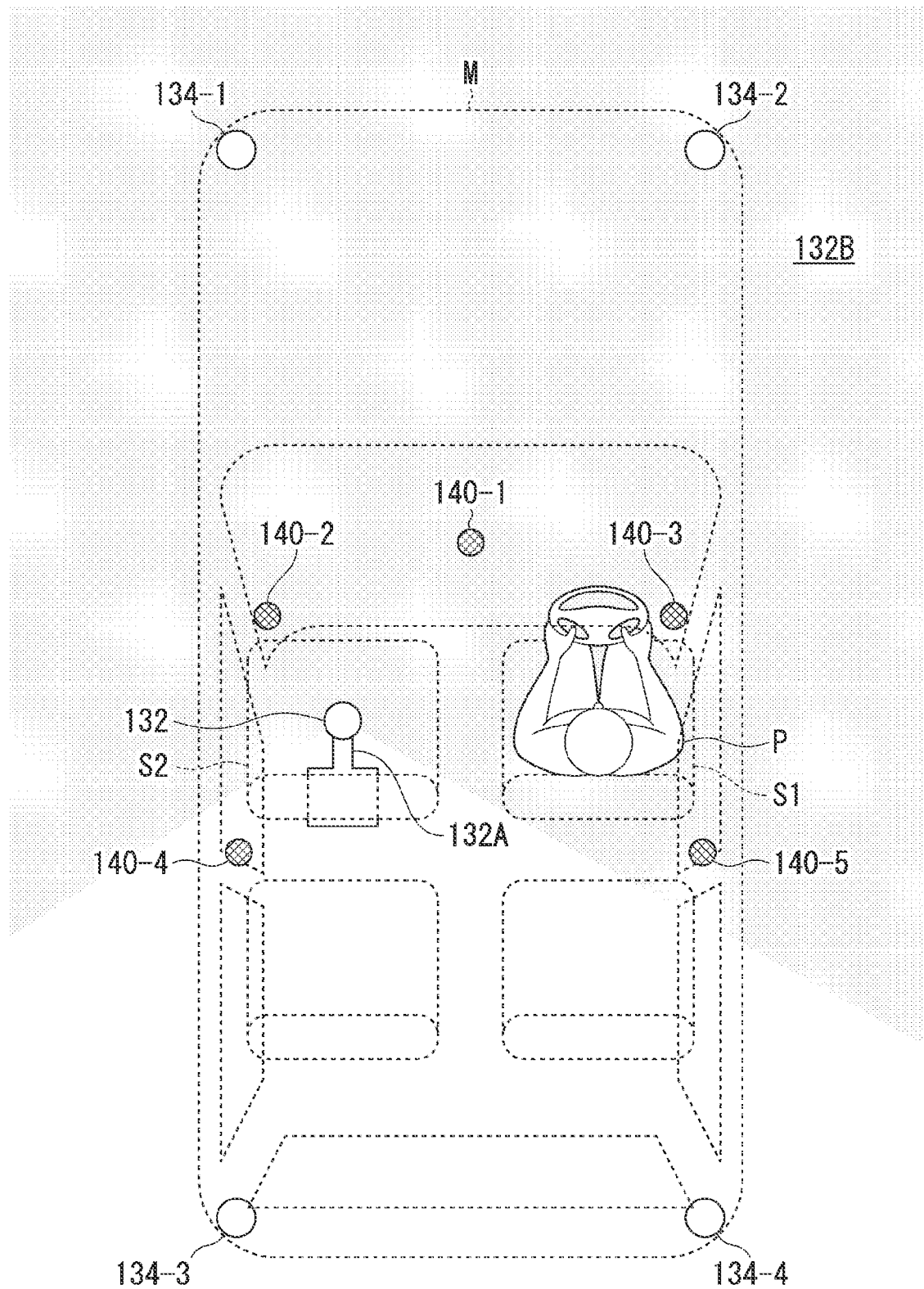
FIG. 4 is a diagram illustrating an arrangement example of a part of the first device in a mobile object.

FIG. 4 is a diagram illustrating an arrangement example of a part of the first device 100 in the mobile object M. For example, the inside camera 132 is attached to a neck pillow of a passenger's seat S2 (an example of a "predetermined seat") using an attachment 132A and is provided on a position which is slightly separated in a traveling direction of the mobile object M from a backrest of the passenger's seat S2. The inside camera 132 includes a wide-angle lens and can image a range indicated by a hatched area 132B in the drawing. The inside camera 132 can also image the outside via a windshield as well as the inside of the mobile object M. In the following description, it is assumed that the passenger's seat S2 is the predetermined seat, but the predetermined seat may be another seat such as a rear seat.

The outside camera 134 includes, for example, a plurality of sub outside cameras 134-1 to 134-4. By combining images captured by the plurality of sub outside cameras 134-1 to 134-4, an image such as a panoramic image of the outside view of the mobile object M is obtained. The outside camera 134 may include a wide-angle camera provided on the roof of the mobile object M instead thereof (or in addition thereto). A camera that can image a rear view of the passenger's seat S2 may be added as the inside camera 132, and a mobile-object image which will be described later may be generated as a 360-degree panoramic image by the first control device 170 by combining images captured by one or more inside camera 132 or may be generated as a 360-degree panoramic image by appropriately combining the images captured by the inside camera 132 and the image captured by the outside camera 134.

The first speaker 140 outputs voice of the user U acquired via the first communication device 110. The first speaker 140 includes, for example, a plurality of sub first speakers 140-1 to 140-5. For example, the sub first speaker 140-1 is provided at the center of an instrument panel, the sub first speaker 140-2 is provided at a left end of the instrument panel, the sub first speaker 140-3 is provided at a right end of the instrument panel, the sub first speaker 140-4 is provided in a lower part of a left door, and the sub first speaker 140-5 is provided in a lower part of a right door. When voice of the user U is output from the first speaker 140, the first control device 170 localizes a sound image such that the occupant P sitting on the driver's seat S1 hears sound from the passenger's seat S2, for example, by allowing the sub first speaker 140-2 and the sub first speaker 140-4 to output the voice of the user U with the same sound volume and turning off the other sub first speakers 140. The method of localizing a sound image is not limited to adjustment of a sound volume and may be performed by causing phases of sound output from the sub first speakers 140 to be different. For example, when a sound image is localized such as sound is heard from the left, a timing at which sound is output from the left sub first speaker can be set to be slightly earlier than a timing at which the same sound is output from the right sub first speaker.

When voice of the user U is output from the first speaker 140, the first control device 170 may localize a sound image such that the occupant P hears sound from a position of a height corresponding to the head height of the user U on the passenger's seat S2 and cause the first speaker 140 to output the voice uttered by the user U. In this case, the first speaker 140 needs to include a plurality of sub first speakers 140-k (where k is a natural number of two or more) with different heights.

Figure 5:
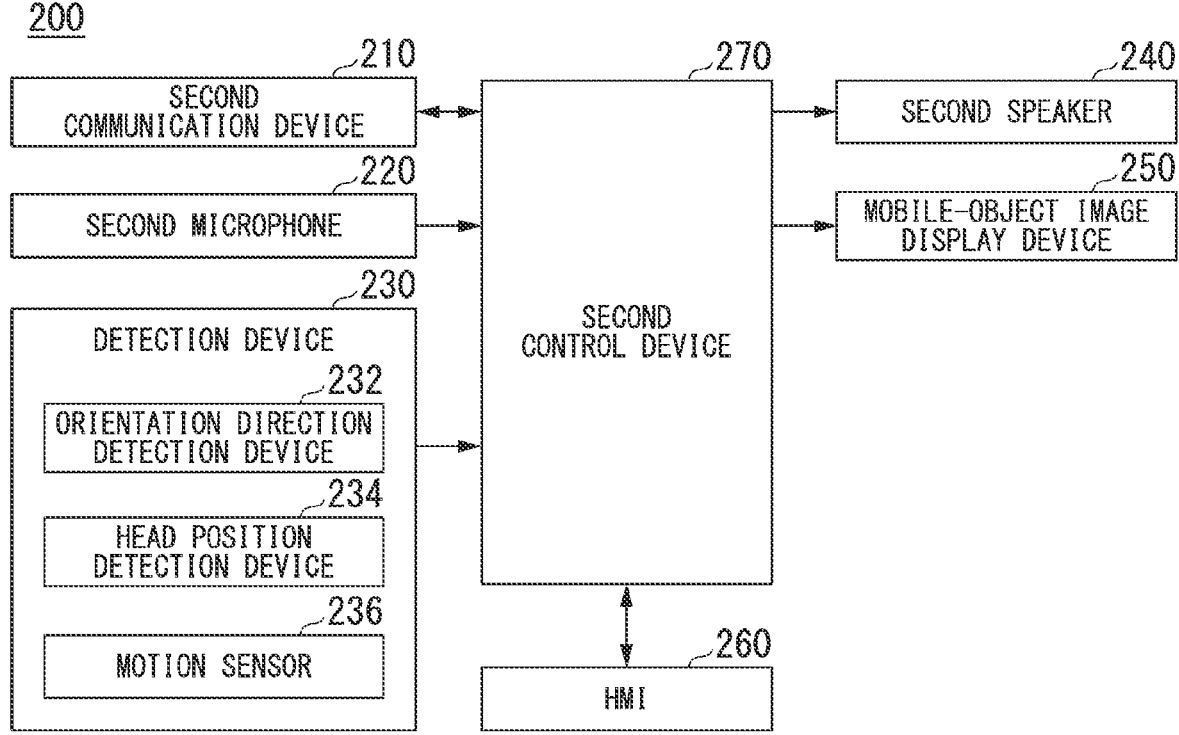
FIG. 5 is a diagram illustrating a configuration of a second device.

FIG. 5 is a diagram illustrating a configuration of the second device 200. The second device 200 includes, for example, a second communication device 210, a second microphone 220, a detection device 230, a second speaker 240, a mobile-object image display device 250, an HMI 260, and a second control device 270. The detection device 230 includes, for example, an orientation direction detection device 232, a head position detection device 234, and a motion sensor 236.

The second communication device 210 is a communication interface that communicates with the communication device 310 of the management server 300 and the first communication device 110 of the first device 100 via the network NW.

The second microphone 220 collects voice uttered by the user U. For example, the voice collected by the second microphone 220 is transmitted from the second communication device 210 to the first communication device 110 via the second control device 270.

The orientation direction detection device 232 is a device that detects an orientation direction. An orientation direction is a direction of a face or a direction of a sightline of the user U or a direction based on both. Alternatively, the orientation direction may be a direction indicated by a motion of an arm or a finger such as a motion of tilting a terminal device used by the user U or a motion of swiping a screen. In the following description, it is assumed that the orientation direction is an angle in a horizontal plane, that is, an angle not having a component in a vertical direction, but the orientation direction may be an angle having a component in the vertical direction. The orientation direction detection device 232 may include a physical sensor (for example, an acceleration sensor or a gyro sensor) attached to a VR goggle which will be described later or may be an infrared sensor that detects a plurality of positions of the head of the user U or a camera that images the head of the user U. In any case, the second control device 270 calculates the orientation direction on the basis of information input from the orientation direction detection device 232. Various techniques therefor are known and thus detailed description thereof will be omitted.

The head position detection device 234 is a device that detects a position (height) of the head of the user U. For example, one or more infrared sensors or optical sensors provided near a seat on which the user U sits are used as the head position detection device 234. In this case, the second control device 270 detects the position of the head of the user U on the basis of whether there is a detection signal from the one or more infrared sensors or optical sensors. The head position detection device 234 may be an acceleration sensor attached to the VR goggle. In this case, the second control device 270 detects the position of the head of the user U by integrating a value obtained by subtracting the gravitational acceleration from the output of the acceleration sensor. Information of the acquired position of the head is provided as height information to the second control device 270. The position of the head of the user may be acquired on the basis of an operation of the user U on the HMI 260. For example, the user U may input a body height in a numerical value to the HMI 260 or may input a body height using a dial switch included in the HMI 260. In this case, the position, that is, height information, of the head from the body height is calculated. The user U may input a discrete value of a physical constitution such as large/middle/small instead of a continuous value to the HMI 260. In this case, the height information is acquired on the basis of information indicating the physical constitution. Instead of particularly acquiring the height of the head of the user, the height of the head of the user U may be simply acquired on the basis of a physical constitution (for each of male and female) of a regular adult.

The motion sensor 236 is a device that recognizes a gesture operation which is performed by the user U. For example, a camera that images an upper half of the user U is used as the motion sensor 236. In this case, the second control device extracts feature points (such as a fingertip, a wrist, and an elbow) of the body of the user U from an image captured by the camera and recognizes the gesture operation of the user U on the basis of motions of the feature points.

The second speaker 240 outputs voice acquired via the second communication device 210 and uttered by the occupant P. The second speaker 240 has, for example, a function of changing a direction in which voice is heard. The second control device 270 causes the second speaker to output voice such that the user U hears voice from the position of the occupant P when seen from the passenger's seat S2. The second speaker 240 includes a plurality of sub second speakers 240-$n$ (where n is a natural number of 2 or more). Sound image localization may be performed by causing the second control device 270 to adjust sound volumes of the sub second speakers 240-$n$, or sound image localization may be performed using a function of a headphone when the headphone is attached to a VR goggle.

Figure 6:
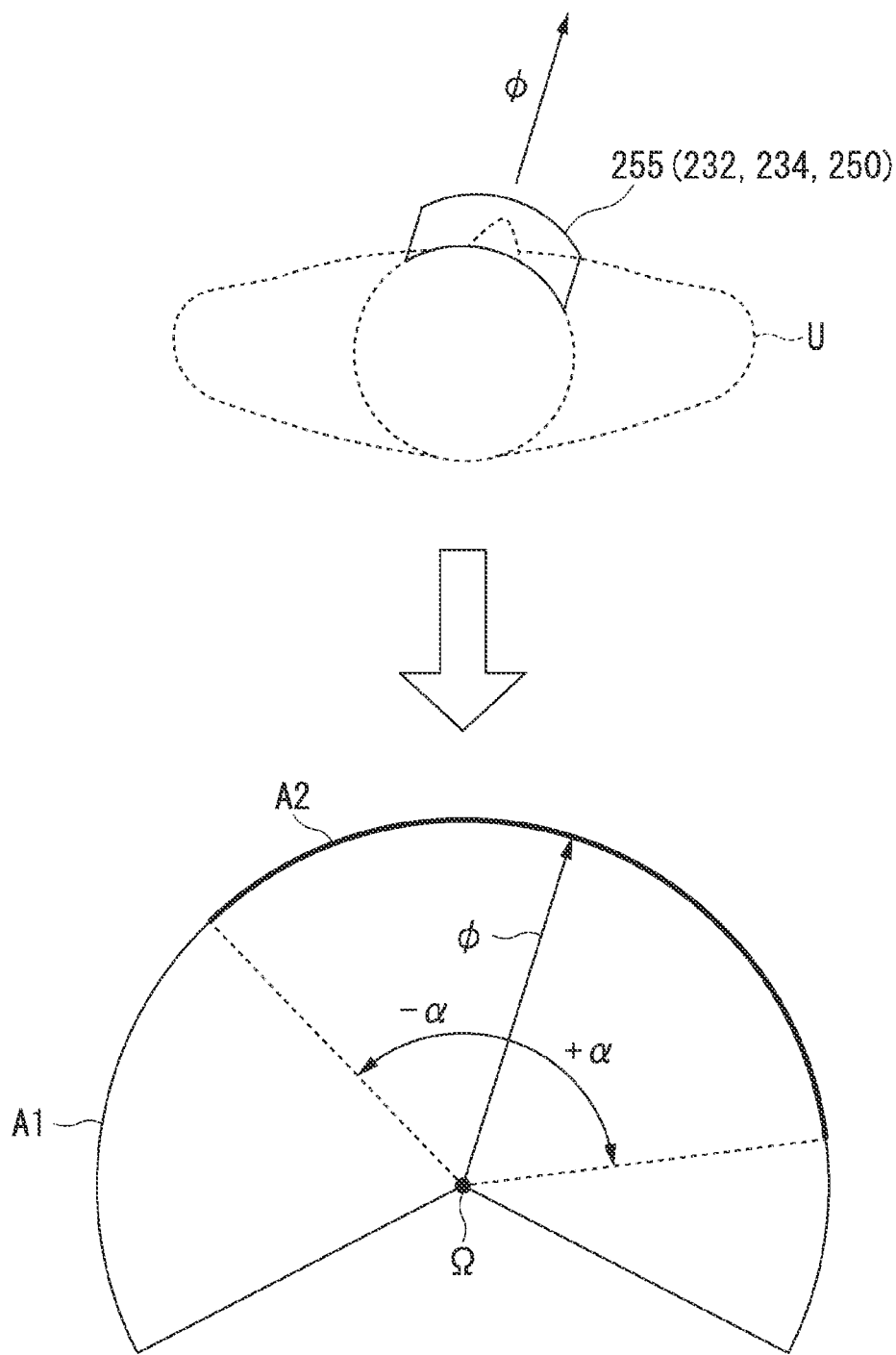
FIG. 6 is a diagram illustrating an image corresponding to an orientation direction.

The mobile-object image display device 250 displays an image corresponding to the orientation direction when seen from the passenger's seat out of images captured by the camera unit 130 (which may be images subjected to the combination process and which is referred to as a mobile-object image in the following description). FIG. 6 is a diagram illustrating an image corresponding to an orientation direction. In the example illustrated in the drawing, a VR goggle 255 includes a physical sensor serving as the orientation direction detection device 232 and the head position detection device 234 and the mobile-object image display device 250. The second control device 270 detects a direction which the VR goggle 255 faces as an orientation direction with a pre-calibrated direction as a reference direction. Various techniques for this function are known and detailed description thereof will be omitted.

The mobile-object image display device 250 displays an image A2 in an angle range of $\pm \alpha$ with respect to the orientation direction in a mobile-object image A1 (which has an angle of about 240 degrees in the drawing, a viewing angle of which may be extended by the aforementioned combination process) to the user U.

The HMI 260 includes a touch panel, an audio response device (an agent device), or the aforementioned switches. The HMI 260 receives various instructions of the occupant P for the second device 200.

The second control device 270 includes, for example, a processor such as a CPU and a storage medium connected to the processor and storing a program (an instruction group) and controls the constituent units of the second device 200 by causing the processor to execute the instruction group.

Functional Configuration

The functional configurations of the first control device 170 and the second control device 270 will be described below.

First Example

Figure 7:
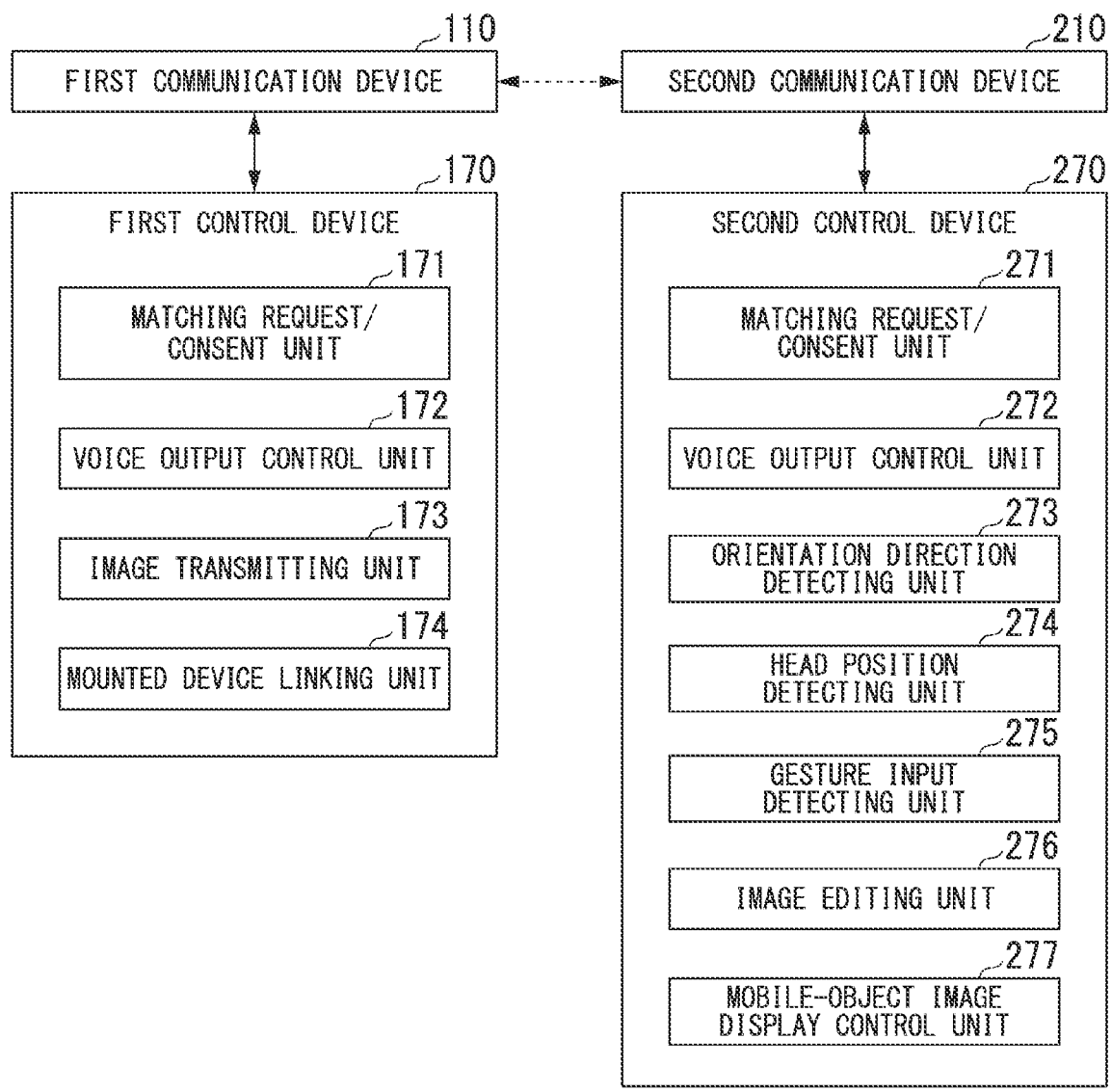
FIG. 7 is a diagram illustrating a first example of a functional configuration of a first control device and a second control device.

FIG. 7 is a diagram illustrating a first example of the functional configurations of the first control device 170 and the second control device 270. In the first example, the first control device 170 includes a matching request/consent unit 171, a voice output control unit 172, an image transmitting unit 173, and a mounted device linking unit 174. The second control device 270 includes a matching request/consent unit 271, a voice output control unit 272, an orientation direction detecting unit 273, a head position detecting unit 274, a gesture input detecting unit 275, an image editing unit 276, and a mobile-object image display control unit 277. These functional units are realized, for example, by causing a processor such as a CPU to execute a program (an instruction group). Some or all of these elements may be realized by hardware (a circuit part including circuitry) such as a large scale integration (LSI) device, an application-specific integrated circuit (ASIC), or a field-programmable gate array (FPGA), or a graphics processing unit (GPU) or may be cooperatively realized by software and hardware.

The matching request/consent unit 171 receives an input of a matching request from the occupant P using the HMI 160 and transmits the matching request to the management server 300 or receives an input of a consent to the matching request received from the management server 300 using the HMI 160 and transmits the consent to the management server 300. The matching request/consent unit 171 controls the first communication device 110 such that the second device 200 of the user U who has been matched is a communication partner.

The voice output control unit 172 controls the first speaker 140 as described above.

The image transmitting unit 173 transmits a mobile-object image A1 to the second device 200 using the first communication device 110.

The mounted device linking unit 174 controls the control target device 190 on the basis of an instruction signal input from the second device 200.

The matching request/consent unit 271 receives an input of a matching request from the user U using the HMI 260 and transmits the matching request to the management server 300 or receives an input of a consent to the matching request received from the management server 300 using the HMI 260 and transmits the consent to the management server 300. The matching request/consent unit 271 controls the second communication device 210 such that the first device 100 of the occupant P who has been matched is a communication partner.

The voice output control unit 272 controls the second speaker 240 as described above.

The orientation direction detecting unit 273 detects an orientation direction on the basis of an output of the orientation direction detection device 232. The head position detecting unit 274 detects a height of the head of the user U on the basis of an output of the head position detection device 234. The head position may be expressed by three-dimensional coordinates or the height of the head may be detected as the head position. The gesture input detecting unit 275 detects a gesture input of the user U on the basis of an output of the motion sensor 236.

The image editing unit 276 performs a process of cutting out an image A2 corresponding to the orientation direction when seen from the passenger's seat from the mobile-object image A1 (FIG. 6). The mobile-object image display control unit 277 causes the mobile-object image display device 250 to display the image A2 cut out by the image editing unit 276. At this time, the image editing unit 276 may cause the mobile-object image display device 250 to display an image corresponding to the orientation direction when seen from the height indicated by the height information of the head of the user U.

Second Example

Figure 8:
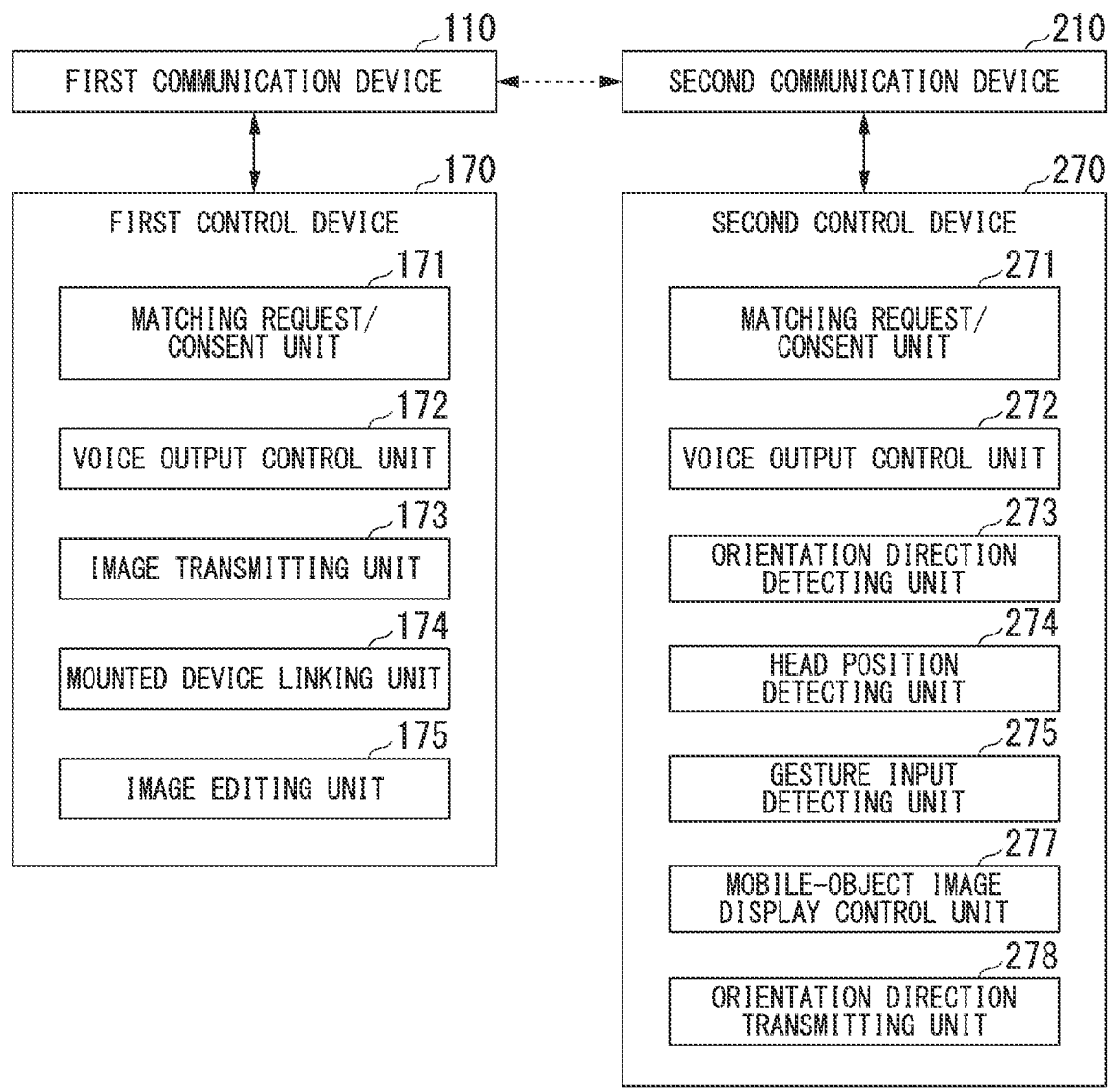
FIG. 8 is a diagram illustrating a second example of the functional configuration of the first control device and the second control device.

FIG. 8 is a diagram illustrating a second example of the functional configurations of the first control device 170 and the second control device 270. The second example is different from the first example illustrated in FIG. 7, in that the first control device 170 includes an image editing unit 175 and the second control device 270 does not include the image editing unit 276 and includes an orientation direction transmitting unit 278. The other elements basically have the same functions as in the first example and thus repeated description thereof will be omitted.

The orientation direction transmitting unit 278 transmits the orientation direction φ detected by the orientation direction detecting unit 273 to the first device 100 using the second communication device 210.

The image editing unit 175 performs a process of cutting out an image A2 corresponding to an orientation direction (transmitted from the second device 200) when seen from the passenger's seat from the mobile-object image A1 (FIG. 6). At this time, the image editing unit 175 may acquire height information of the head of the user U from the second device 200 and may perform a process of cutting out the image A2 corresponding to the orientation direction when seen from the height indicated by the height information.

The image transmitting unit 173 in the second example transmits the image A2 cut out by the image editing unit 175 to the second device 200 using the first communication device 110. Then, the mobile-object image display control unit 277 causes the mobile-object image display device 250 to display the image A2 transmitted from the first device 100.

Operation by Gesture

Figure 9:
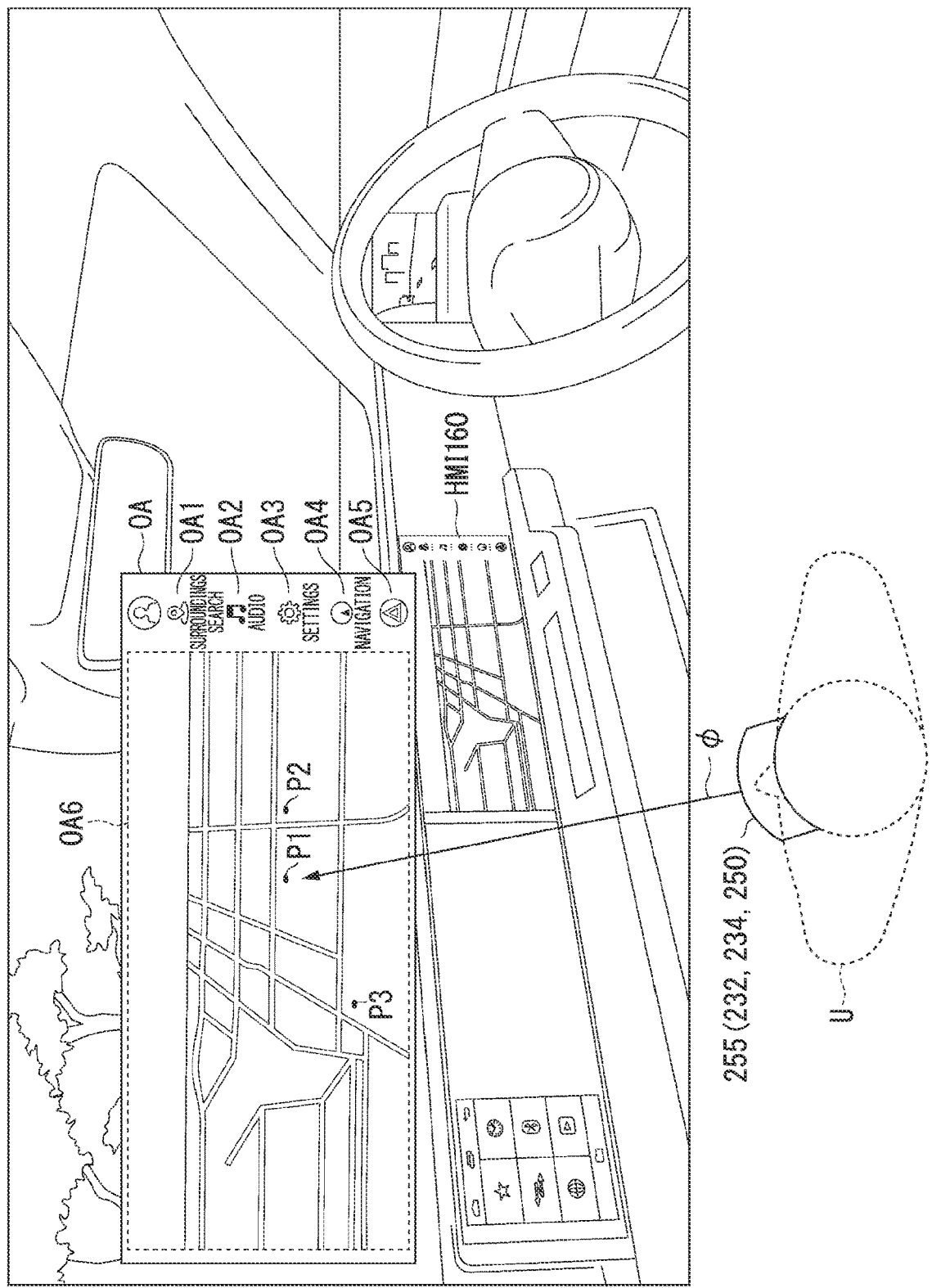
FIG. 9 is a diagram illustrating an example of an image corresponding to an orientation direction.

FIG. 9 is a diagram illustrating an example of an image corresponding to an orientation direction. The image illustrated in FIG. 9 is displayed by causing the mobile-object image display device 250 to display an image corresponding to the orientation direction when seen from the passenger's seat (hereinafter also referred to as an "orientation image") out of the images captured by the camera unit 130 to the user U. In the orientation image illustrated in FIG. 9, an operation area OA displays an operation area displayed by the HMI 160 of the mobile object M without any change (or with simplification) to the user U and enables the user U to remotely operate the HMI 160. As will be described below in detail, details of the operation performed on the operation area OA by the user U are transmitted from the second communication device 210 to the first device 100, and the first device 100 causes the mobile object M to perform the operation details. As illustrated in FIG. 9, the operation area OA includes, for example, a plurality of operation areas such as operation areas OA1 to OA6.

First, the second device 200 identifies an operation area corresponding to the orientation direction of the user U detected by the orientation direction detecting unit 273 out of the operation areas OA1 to OA6 in the orientation image. For example, when the user U makes a gesture of pointing in the orientation direction φ with a finger in the operation area OA1 indicating "surroundings search," the mobile-object image display device 250 overlaps store/facility information within a predetermined distance from the mobile object M on the orientation image and displays the resultant image, for example, as a map. At the same time, the second communication device 210 transmits the operation information to the first device 100, and the first device 100 causes the HMI 160 of the mobile object M to display the store/facility information within the predetermined distance from the mobile object M in response to reception of the operation information. FIG. 9 illustrates a situation in which store/facility information near the mobile object M is displayed as a map as a result of making a gesture of the user U for the "surroundings search." Accordingly, the occupant P can ascertain information near the mobile object M without operating the HMI 160 even while driving the mobile object M.

In the situation illustrated in FIG. 9, the second device 200 identifies a point corresponding to the orientation direction φ of the user U detected by the orientation direction detecting unit 273 on the map. For example, in FIG. 9, points P1 to P3 are displayed on the map, and the orientation direction detecting unit 273 identifies the point P1 as a point corresponding to the orientation direction φ of the user U. When the gesture input detecting unit 275 detects a gesture of the user U of operating the point P1 in a state in which the point P1 is identified, the second device 200 performs an operation corresponding to the detected gesture on the point P1. For example, in FIG. 9, when the user U makes a gesture of pointing to the point P1 with a finger, the mobile-object image display device 250 displays details information (for example, menu information) of a store corresponding to the point P1 to overlap the orientation image.

For example, when the user U makes a gesture of pointing to the operation area OA2 indicating "audio" with a finger in the orientation direction φ, the voice output control unit 272 causes the second speaker 240 to output vocal sound. At the same time, the second communication device 210 transmits the operation information to the first device 100, and the first device 100 activates an audio instrument of the mobile object M in response to reception of the operation information. For example, the user U selects a musical piece to be reproduced by operating the operation area OA2 with the gesture, and the voice output control unit 272 causes the second speaker 240 to reproduce the selected musical piece. At the same time, the second communication device 210 transmits information indicating the selected musical piece to the first device 100, and the first device 100 causes the audio instrument of the mobile object M to reproduce the musical piece. Accordingly, the occupant P can hear music without operating the HMI 160 even while driving the mobile object M.

For example, when the user U makes a gesture of pointing to the operation area OA3 indicating "settings" with a finger in the orientation direction φ, the mobile-object image display device 250 displays a screen for changing settings of the mobile object M to overlap the orientation image. The user U changes settings of the mobile object M by additionally making a gesture on the screen for changing the settings of the mobile object M. At the same time, the second communication device 210 transmits the operation information to the first device 100, and the first device 100 changes the settings of the mobile object M in response to reception of the operation information. For example, the user U changes air-conditioning settings of the mobile object M by operating the operation area OA3 with a gesture, and the second communication device 210 transmits information indicating the changed air-conditioning settings to the first device 100. The first device 100 changes the air-conditioning settings of the mobile object M on the basis of the information indicating the changed air-conditioning settings. Accordingly, the occupant P can change the air-conditioning settings of the mobile object M without operating the HMI 160 even while driving the mobile object M.

For example, when the user U makes a gesture of pointing to the operation area OA4 indicating "navigation" with a finger in the orientation direction ϕ, the mobile-object image display device 250 displays a screen for changing navigation settings of the mobile object M to overlap the orientation image. The user U changes navigation settings of the mobile object M by additionally making a gesture on the screen for changing the navigation settings of the mobile object M. At the same time, the second communication device 210 transmits the operation information to the first device 100, and the first device 100 changes the navigation settings of the mobile object M in response to reception of the operation information. For example, the user U changes a destination of the mobile object M by operating the operation area OA4 with a gesture, and the second communication device 210 transmits information indicating the changed destination to the first device 100. The first device 100 changes the destination of the mobile object M on the basis of the information indicating the changed destination. Accordingly, the occupant P can change the destination of the mobile object M without operating the HMI 160 even while driving the mobile object M.

For example, when the user U makes a gesture of pointing to the operation area OA5 indicating "hazard lamp" with a finger in the orientation direction ϕ, the second communication device 210 transmits the operation information to the first device 100, and the first device 100 turns on the hazard lamp of the mobile object M in response to reception of the operation information. Accordingly, the occupant P can turn on the hazard lamp to attract attention of vehicles near the mobile object M without operating the HMI 160 even while driving the mobile object M.

The operation areas OA1 to OA5 are merely an example, and an operation area associated with arbitrary control of the mobile object M may be displayed on the mobile-object image display device 250 and operated by the user U with a gesture. For example, the operation area may include an operation area for opening or closing a window of the mobile object M, an operation area for operating a wiper of the mobile object M, and an operation area for selecting displayed store menus and performing payment by selecting a point.

Operation Authority

As described above, in this embodiment, the mobile-object image display device 250 displays an operation area for allowing the user U to remotely operate the mobile object M to overlap an image, but it may not be preferable that the user U be allowed to operate all the operation areas in combinations of all occupants P and all users U. More specifically, it is preferable that a user U be allowed to operate more operation areas when an occupant P and the user U are friendly with each other and a user U be allowed to operate fewer operation areas when the occupant P and the user U are unfriendly. Therefore, in this embodiment, the management server 300 stores user data 360C for defining a range of operation areas for a user U (that is, an operation authority) in the storage unit 350 in advance for combinations of the occupant P and the user U and allows the user U to operate the operation areas within the operation authority with reference to the user data 360C when the occupant P and the user U are matched.

FIG. 10 is a diagram illustrating an example of details of the user data 360C for defining an operation authority to a mobile object M. In the user data 360C, for example, an operation authority of a user corresponding to a user ID is correlated with a combination of an occupant ID and a user ID. In the user data 360C, for example, an occupant may set an operation authority given to each user in advance. At this time, it may take time for the occupant to set an operation authority of each user. Accordingly, for example, as described in rows 2 and 3 of the user data 360C, the occupant may set the operation authorities given to all users equally (that is, "ALL") and individually set the operation authority for a user to whom the occupant wants to give a greater operation authority. On the other hand, the occupant may equally set the operation authorities given to all users and individually set the operation authority for a user to whom the occupant wants to give a less operation authority.

Figure 11:
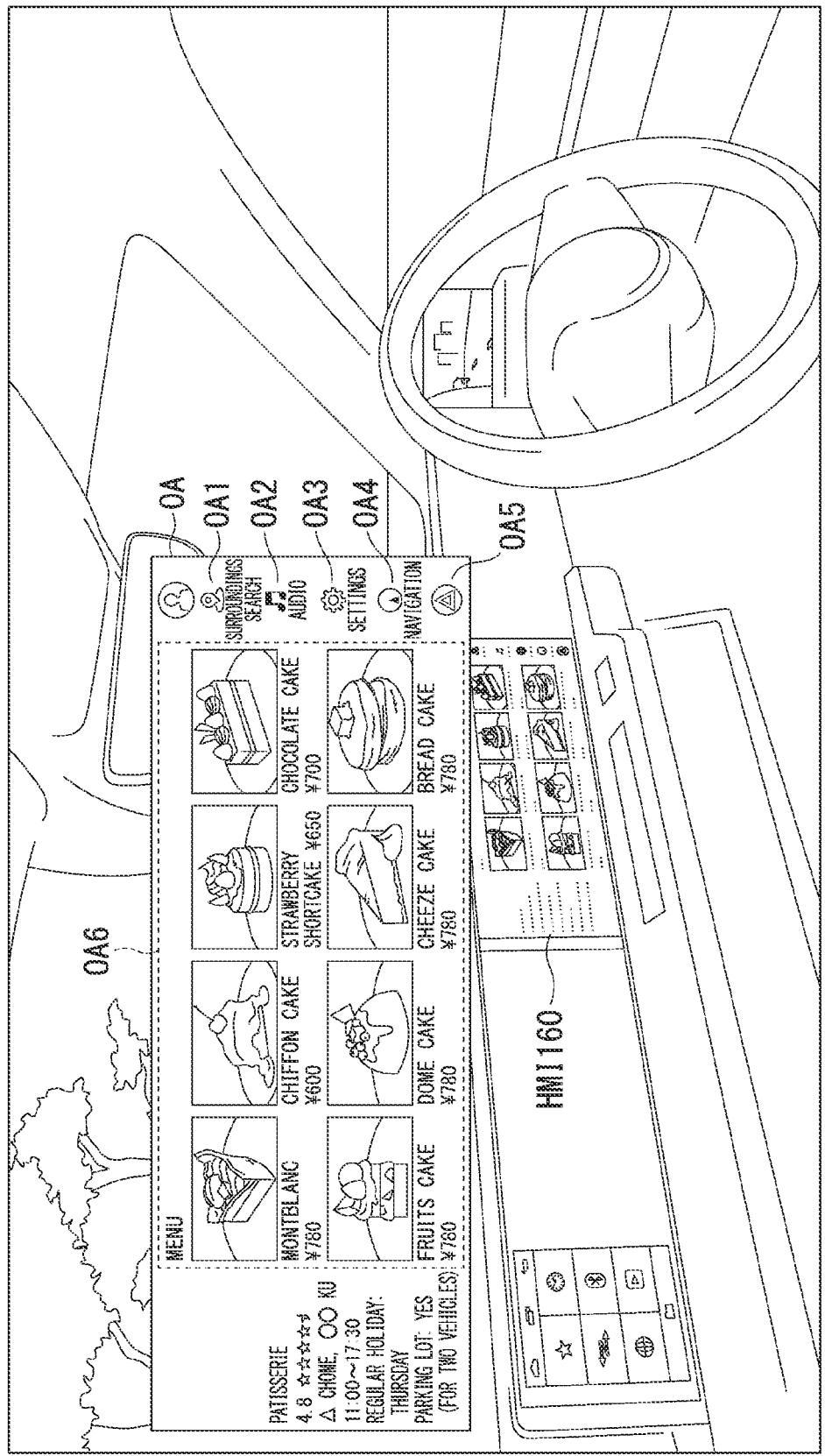
FIG. 11 is a diagram illustrating an example of an image of an operation area to which an operation authority is owned by a user.

FIG. 11 is a diagram illustrating an example of an image representing an operation area to which an operation authority is given to a user U. The image illustrated in FIG. 11 is displayed, for example, by causing the user U to select the point P1 in the image illustrated in FIG. 9 with a gesture thereof. In FIG. 11, a newly displayed operation area OA includes the operation areas OA1 to OA5 and an operation area OA6 for selecting a menu.

The mobile-object image display device 250 may explicitly display only an operation area to which an operation authority is given to the user U out of a plurality of operation areas, whereby it is possible to improve convenience for the user U. For example, as illustrated in FIG. 11, when the user U has only an operation authority to operate an audio instrument of the mobile object M, the mobile-object image display device 250 highlights only the operation area OA2 corresponding to an operation of the audio instrument. For example, the mobile-object image display device 250 may display only the operation area OA2 corresponding to the operation of the audio instrument and not display the other operation areas. Accordingly, it is possible to improve convenience for the user U selecting and operating the operation area.

Display of Gesture

Figure 12:
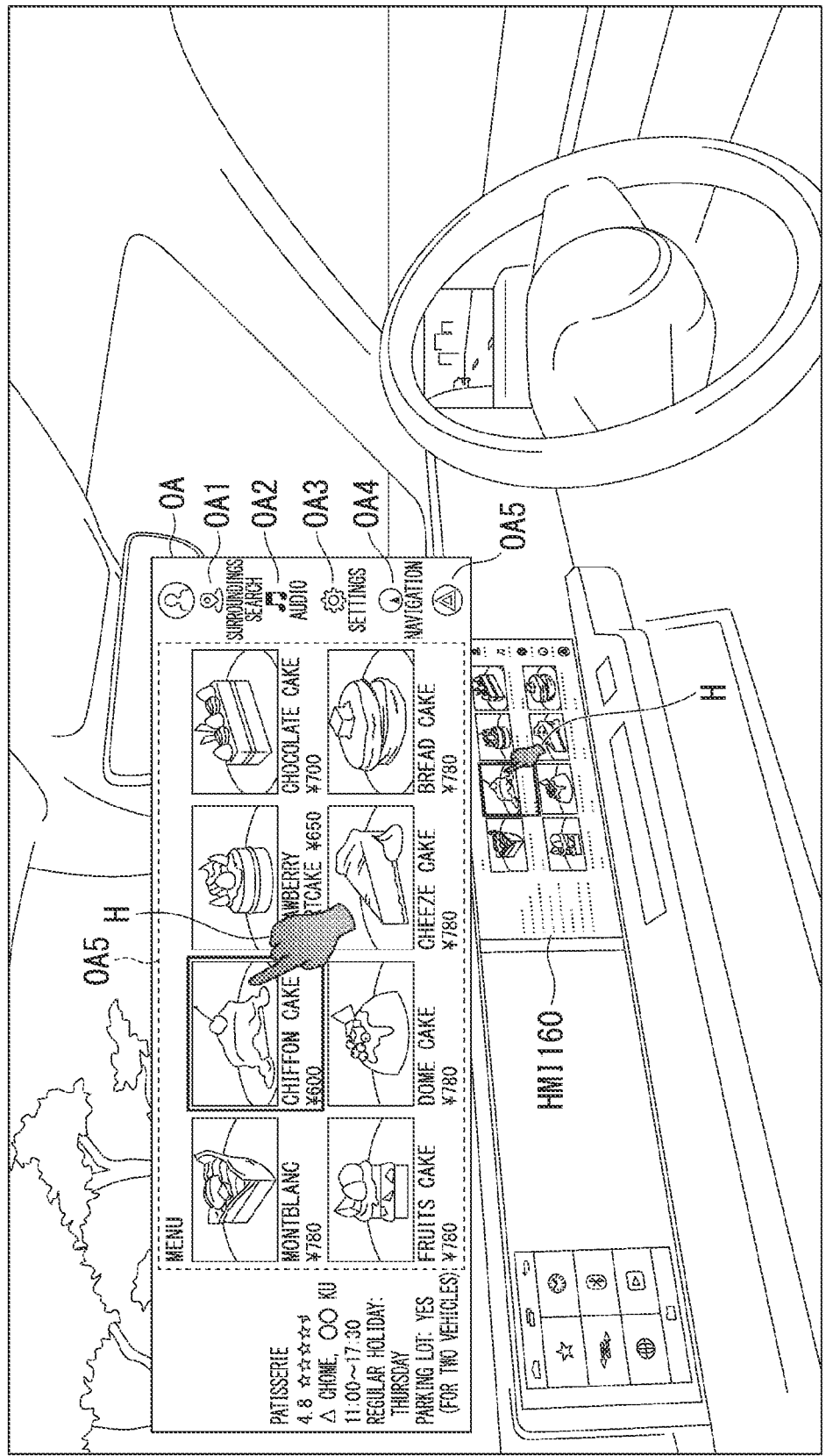
FIG. 12 is a diagram illustrating an example of a method of displaying an indication image H indicating a gesture of a user to overlap an operation area.

The mobile-object image display device 250 may display an indication image H indicating a gesture of the user U detected by the gesture input detecting unit 275 to overlap the operation area. FIG. 12 is a diagram illustrating an example of a method of displaying an indication image H indicating a gesture of the user U to overlap the operation area. FIG. 12 illustrates a situation in which one item in the displayed menu is selected by the user U in the image illustrated in FIG. 11.

In this case, the mobile-object image display device 250 displays the indication image H indicating a gesture of the user U to overlap a menu item selected by the user U with the gesture, and the second communication device 210 transmits indication information indicating that the user U has selected the menu item to the first device 100. The first device 100 causes the HMI 160 to similarly display the indication image H indicating the gesture of the user U in response to reception of the indication information. Accordingly, the occupant P can ascertain the operation of the user U in real time. In this embodiment, the mobile-object image display device 250 displays an icon of a hand as the indication image H indicating the gesture of the user U, but the present invention is not limited to this configuration. For example, the mobile-object image display device 250 may display a silhouette or the like indicating an assumed position of a hand of the user U or may display an operation area oriented by the user U in a visible manner out of the operation areas in more general. The first device 100 may include a mode in which an image displayed on the mobile-object image display device 250 (an image viewed by the user U) is displayed by the HMI 160.

Figure 13:
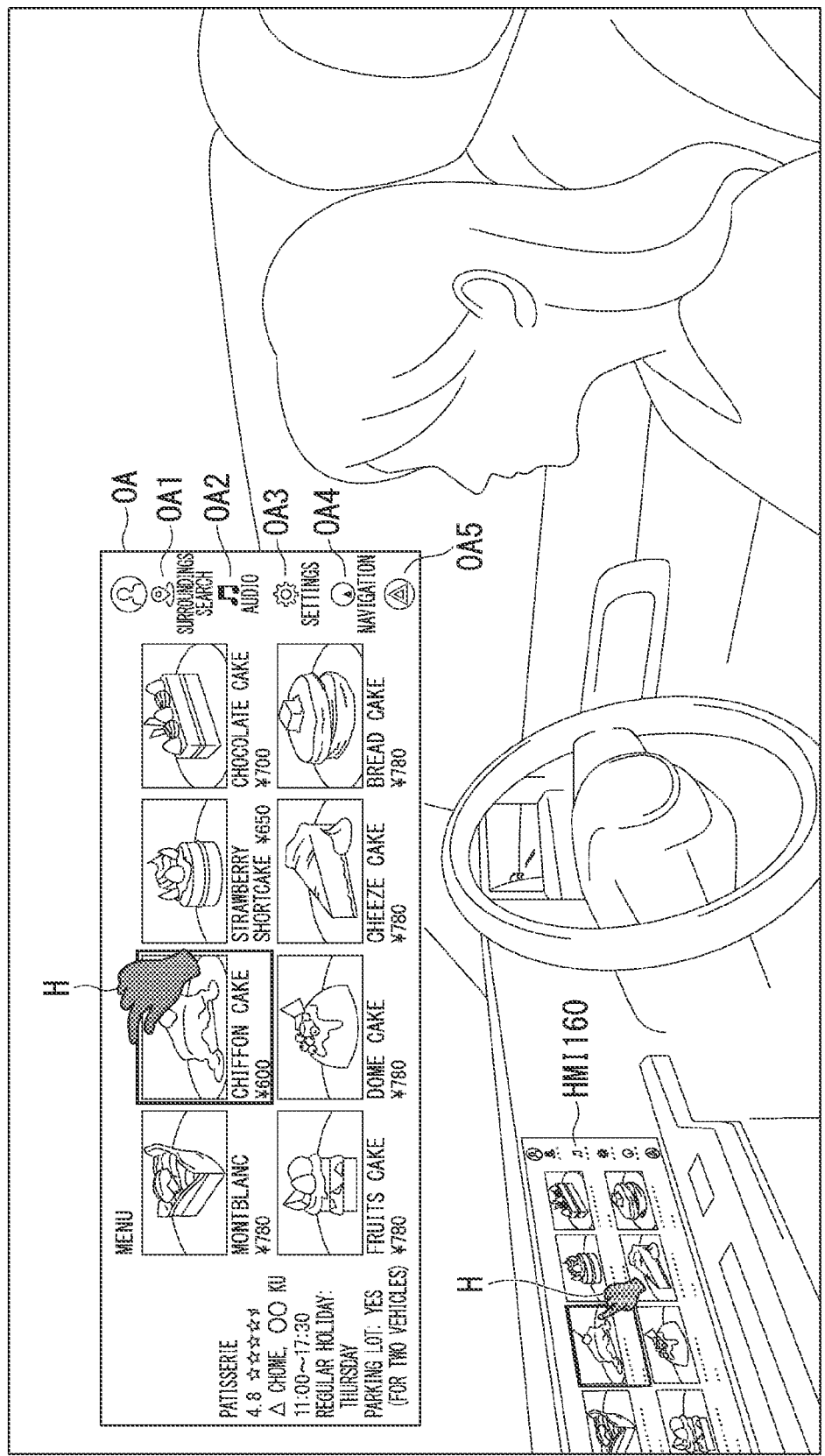
FIG. 13 is a diagram illustrating an example of a method of changing a display mode of an operation area which is displayed for a user U according to a gesture of the user.

The mobile-object image display device 250 may change a display mode of an operation area which is displayed to the user U according to the gesture of the user U detected by the gesture input detecting unit 275. FIG. 13 is a diagram illustrating an example of a method of changing a display mode of an operation area which is displayed to the user U according to the gesture of the user U. FIG. 13 illustrates, for example, a situation in which the user U makes a gesture of grasping and moving an operation area OA displayed by the mobile-object image display device 250.

For example, when the gesture input detecting unit 275 detects that the user U has made a gesture of grasping and moving the operation area OA, the mobile-object image display device 250 may deform and display the indication image H indicating the hand of the user U to grasp the operation area OA. In this case, the mobile-object image display device 250 changes and displays the position of the operation area OA in the direction in which the user U has made the gesture. Accordingly, the user U can change the position of the operation area OA in the image and view an image area which the user wants to see. In this case, movement of the operation area OA in a depth direction or rotation of the screen of the operation area OA may be limited or the position of the operation area OA may be changed while keeping a distance between the operation area OA and the user U constant. Accordingly, it is possible to prevent excessive movement of the operation area OA and to improve a sense of usage.

For example, when the gesture input detecting unit 275 detects that the user U has made a gesture of grasping the operation area OA and moving the operation area at a predetermined acceleration or higher, the mobile-object image display device 250 may not display the operation area OA. In this case, the mobile-object image display device 250 fades out the operation area OA in the direction in which the user U has made the gesture. Accordingly, the user U can view an image area which the user wants to see by not displaying an unnecessary operation area OA.

For example, when the gesture input detecting unit 275 detects that the user U has made a gesture of grasping and widening (or narrowing) the operation area OA with two hands, the mobile-object image display device 250 may enlarge (reduce) the size of the operation area OA. Accordingly, the user U can view an image area which the user wants to see by changing the size of the operation area OA in an image.

Others

In the information processing system 1, the user U can view an arbitrary direction when seen from the passenger's seat S2, but limitation may be provided in a direction in which the user U can see, for example, by agreement at the time of matching. For example, there may be demand for the occupant P side for providing a view in the traveling direction of the mobile object M or a view on the opposite side of the driver's seat S1 but not displaying the occupant's appearance. This is on the basis of the assumption that the occupant P and the user U do not have a relationship of family members or friends and a request for ascertaining a driving feeling of the mobile object M or seeing a view of a desired street is responded to. In this case, such limitation is set when the matching processing unit 320 of the management server 300 performs a matching process, and the first control device 170 or the second control device 270 masks an angle range which is not to be seen or performs correction according to the settings such that the orientation direction φ does not face the limited direction. Information on this limitation is associated with privacy of the occupant P and thus may be set by the first device 100 side.

CONCLUSION

With the information processing system 1 having the aforementioned configuration, it is possible to enhance a sense of realism which is given to both an occupant P in a mobile object M and a user U located at a place different from the mobile object M. An image corresponding to an orientation direction φ of the user when seen from a passenger's seat is displayed to the user U, and the user U can remotely operate the mobile object M by operating an operation area displayed on an image with a gesture. An image indicating the gesture of the user U is also displayed on the HMI of the mobile object M in the same way, and the occupant P can ascertain the operation of the user U in real time. By enabling the user U to change a display mode of the operation area displayed on the image with a gesture of the user, it is possible to improve convenience for the user U.

Use Mode

The information processing system 1 can be used in the following manners.

(A) A manner in which an occupant P and a user U have a relationship of family members, friends, or the like and virtual driving is provided to the user U. The user U can make a conversation with the occupant P about a scenery near the mobile object M while seeing an image.

(B) A manner in which an occupant P is a general user and a user U is a provider of a route guidance service, a driving training service, or the like. The user U can perform route guidance or training of a driving operation in a place which it is difficult to understand using a navigation device or which does not appear on a map while seeing a scenery near the mobile object M.

(C) A manner in which an occupant P is a celebrity, a user U is a general user, and commercially based virtual driving is provided to the user U. In this case, a plurality of users U may be together correlated with one occupant P, and, for example, transmission of voice from the users U may be set to an off state.

While exemplary embodiments of the present invention have been described above, the present invention is not limited to the embodiments and can be subjected to various modifications and substitutions without departing from the gist of the present invention.

What is claimed is:
1. An information processing system comprising:
a first device that is mounted in a mobile object which an occupant boards; and
a second device that is used by a user who is not the occupant at a place located outside of the mobile object and different from the mobile object,
wherein the first device includes:
a first communication device configured to communicate with a second communication device of the second device; and
a camera unit including one or more cameras including at least an inside camera that is provided on a predetermined seat of the mobile object and images an inside of the mobile object from a viewpoint of the predetermined seat, wherein the second device includes:
- the second communication device configured to communicate with the first communication device;
- a detection device configured to detect an orientation direction of the user based on a face or sightline direction of the user, and detect a gesture of the user based on motions of feature points of the user; and
- a display device configured to display an image corresponding to the orientation direction from the viewpoint of the predetermined seat out of images captured by the camera unit, wherein the second device determines, within the image, an operation unit of the mobile object corresponding to the detected orientation direction and operation details on the operation unit corresponding to the detected gesture, and wherein the second communication device transmits the determined operation details on the operation unit to the first communication device such that the operation unit is remotely operated by the user located outside of the mobile object according to the determined operation details.

2. The information processing system according to claim 1, wherein the display device changes and displays a position of the operation unit according to the gesture.

3. The information processing system according to claim 1, wherein the display device changes and displays a size of the operation unit according to the gesture.

4. The information processing system according to claim 1, wherein the display device highlights operation units, comprising the operation unit, that are able to be operated by the user out of a plurality of the operation units.

5. The information processing system according to claim 1, wherein the second device determines the operation unit of the mobile object of which operation is permitted to the user from the image on the basis of an operation authority to the operation unit of the mobile object set for the user.

6. The information processing system according to claim 1, wherein the first device further includes a display configured to display the image indicating the operation unit.

7. The information processing system according to claim 1, wherein the second communication device transmits information of the orientation direction to the first communication device,
- wherein the first device further includes a first control device configured to control the first communication device such that the image corresponding to the orientation direction acquired via the first communication device out of the images captured by the camera unit is selectively transmitted to the second communication device, and
- wherein the display device of the second device displays the image corresponding to the orientation direction from the viewpoint of the predetermined seat, the image being acquired via the second communication device.

8. The information processing system according to claim 1, wherein the first communication device transmits the images captured by the camera unit to the second communication device, and
- wherein the second device further includes a second control device configured to selectively display, on the display device, the image corresponding to the orientation direction out of the images captured by the camera unit.

9. The information processing system according to claim 1, wherein the display device is a display device of a virtual reality (VR) goggle, and
- wherein the detection device includes a physical sensor attached to the VR goggle.

10. The information processing system according to claim 1, wherein the mobile object is a vehicle, and
- wherein the predetermined seat is a passenger seat.

* * * * *